(12) United States Patent
Okawa et al.

(10) Patent No.: US 8,282,822 B2
(45) Date of Patent: Oct. 9, 2012

(54) MEMBRANE CARTRIDGE IN IMMERSION TYPE MEMBRANE SEPARATION APPARATUS

(75) Inventors: Yusuke Okawa, Tokyo (JP); Yasuyuki Okuno, Amagasaki (JP); Hidemi Nagakawa, Amagasaki (JP); Naoki Okuma, Tokyo (JP); Kotaro Kitamura, Tokyo (JP)

(73) Assignee: Hitachi Plant Technologies, Ltd., Tokyo (JP)

( * ) Notice: Subject to any disclaimer, the term of this patent is extended or adjusted under 35 U.S.C. 154(b) by 177 days.

(21) Appl. No.: 12/732,222

(22) Filed: Mar. 26, 2010

(65) Prior Publication Data

US 2010/0243552 A1 Sep. 30, 2010

(30) Foreign Application Priority Data

Mar. 31, 2009 (JP) ................................. 2009-087392

(51) Int. Cl.
*B01D 63/00* (2006.01)
*B01D 63/04* (2006.01)

(52) U.S. Cl. ..................... 210/232; 210/240; 210/321.8; 210/321.89; 210/323.1; 210/340; 210/346

(58) Field of Classification Search .................. 210/232, 210/236, 239, 240, 321.64, 321.72, 321.8, 210/321.89, 323.1, 340, 346
See application file for complete search history.

(56) References Cited

U.S. PATENT DOCUMENTS

| 7,731,848 B2 * | 6/2010 | Kim et al. ................. 210/321.88 |
| 2005/0115899 A1 * | 6/2005 | Liu et al. ........................ 210/636 |

FOREIGN PATENT DOCUMENTS

| JP | 06-178920 | 6/1994 |
| JP | 07-132214 | 5/1995 |
| JP | 2005-313153 | 11/2005 |

* cited by examiner

*Primary Examiner* — John Kim
(74) *Attorney, Agent, or Firm* — Antonelli, Terry, Stout & Kraus, LLP.

(57) ABSTRACT

A membrane cartridge in an immersion type membrane separation apparatus capable of suppressing vibrations applied to the membrane cartridge by an ascending force of membrane cleaning gas and others by firmly coupling the adjacent membrane cartridges disposed in parallel. In a membrane cartridge in an immersion type membrane separation apparatus, selvages larger in thickness than a membrane cartridge main body are formed at both sides of the membrane cartridge, and a header forming part is formed on one selvage, and a guide hole is formed in other selvage relatively, and the header forming part and the guide hole of the membrane cartridge disposed adjacently by varying the direction mutually are formed to communicate and connect with each other.

4 Claims, 5 Drawing Sheets

MEMBRANE CARTRIDGE IN IMMERSION TYPE MEMBRANE SEPARATION APPARATUS

TECHNICAL FIELD

The present invention relates to a membrane cartridge in an immersion type membrane separation apparatus, and more particularly to a membrane cartridge in an immersion type membrane separation apparatus designed to suppress vibrations applied to the membrane cartridge due to an ascending stream or the like of a treated water generated by aeration for cleaning of membrane surface by firmly coupling between membrane cartridges disposed adjacently in parallel.

BACKGROUND ART

Conventionally, a membrane separation active sludge treating method has been known as a method of treating wastewater such as sewage, industrial wastewater, household wastewater and others (see, for example, patent documents 1 to 3).

In this membrane separation active sludge treating method, an immersion type membrane separation apparatus is immersed and installed in a reaction tank for treating wastewater by active sludge treatment. This immersion type membrane separation apparatus is composed by disposing a plurality of membrane cartridges of organic flat membrane type in a main body support frame, and filling by disposing the membrane surface along in the vertical direction. By making use of a negative pressure (inter-membrane differential pressure) generated in the membrane cartridges from the membrane surface between the membrane cartridges, wastewater is sucked and filtered, and the filtered water is taken out as a treated water.

Moreover, an aeration device is disposed in the bottom of a reaction tank at a lower position from an immersion type membrane separation apparatus immersed in the reaction tank, and the membrane cartridges disposed in parallel are agitated within the tank by generating an ascending stream in the wastewater by elevating a membrane cleaning gas (generally, air), so that the surface of the membrane cartridge may be cleaned.

Although the membrane cleaning gas discharged from the aeration device becomes foams and float between membrane cartridges disposed in parallel, thereby cleaning the contaminants sticking to the membrane surface of each membrane cartridge, the floating force of the membrane cleaning gas and the ascending stream of wastewater generated at the same time work to apply vibrations to the membrane cartridges.

Such vibrations of the membrane cartridges are particularly violent in the upper parts of the membrane cartridges. As a result, a strong friction occurs among the frame for mounting the membrane cartridges, the upper parts of membrane cartridges, and the membrane cartridges, and the membrane cartridges are worn significantly, and the service life of the membrane cartridges may be shortened extremely.

Moreover, the membrane cartridges disposed adjacently in parallel at specified intervals are connected with treated water discharge pipes for discharging the treated water filtered on the membrane surface from the membrane cartridges. Hence, solid matter sticks to the treated water discharge pipes at the upper position of the membrane cartridges, and the flow velocity of the treated water ascending between the membrane cartridges is suppressed, and the treated water volume passing through the membrane cartridges is lowered.

PRIOR ART LITERATURE

[Patent Documents]
Patent document 1: Japanese Patent Application Laid-Open No. 6-178920.
Patent document 2: Japanese Patent Application Laid-Open No. 7-132214
Patent document 3: Japanese Patent Application Laid-Open No. 2005-313153

SUMMARY OF THE INVENTION

[Problems to be Solved by the Invention]

The present invention is devised to solve the problems of the membrane cartridges of the immersion type membrane separation apparatus, and is designed to present a membrane cartridge in an immersion type membrane separation apparatus capable of suppressing vibrations applied to the membrane cartridge due to an ascending stream or the like of a membrane cleaning gas by firmly coupling between membrane cartridges disposed adjacently in parallel.

[Means for Solving the Problems]

To achieve the object, the membrane cartridge in the immersion type membrane separation apparatus of the invention is a membrane cartridge of an immersion type membrane separation apparatus composed so as to form passages mutually by disposing adjacently in parallel, in which selvages larger in thickness than the membrane cartridge main body are formed at both sides of the membrane cartridge, and a header forming part is formed on one selvage, and a guide hole is formed in other selvage relatively, and the header forming part and the guide hole of the membrane cartridge disposed adjacently by varying the direction mutually may communicate and connect with each other.

In this case, the header forming part is formed to communicate with the passage of filtered water formed in the membrane cartridge, and mutually communicates with the header forming part of the other membrane cartridge disposed in parallel.

The header forming part is formed to project in a ring shape in the disposing direction of the membrane cartridge, and a header coupling convex part is formed at one side, and a header coupling concave part is formed at other side, so that they can be coupled together mutually.

The guide hole of the membrane cartridge disposed adjacently by varying the direction mutually is externally fitted to the header forming part of the adjacent other membrane cartridge, so that they can be coupled together mutually.

EFFECTS OF THE INVENTION

According to the membrane cartridge in the immersion type membrane separation apparatus of the invention, in a membrane cartridge of an immersion type membrane separation apparatus composed so as to form passages mutually by disposing adjacently in parallel, selvages larger in thickness than the membrane cartridge main body are formed at both sides of the membrane cartridge, and a header forming part is formed on one selvage, and a guide hole is formed in other selvage relatively, and the header forming part and the guide hole of the membrane cartridge disposed adjacently by varying the direction mutually may communicate and connect with each other, and therefore by using membrane cartridges of same shape, and inverting the face and back sides to be adjacent mutually, the membrane cartridges are coupled together and formed into one body, and the membrane cartridges can be coupled firmly, and the headers are formed at both sides of the upper part of the membrane cartridges, so that the filtered water can be discharge smoothly.

Further, the header forming part is formed to communicate with the passage of filtered water formed in the membrane cartridge, and is composed to communicate mutually with the header forming part formed in the other membrane cartridge disposed in parallel, and the membrane cartridges may be coupled and assembled easily and firmly.

The header forming part is formed to project in the disposing direction of the membrane cartridge, and a header coupling convex part is formed at one side, and a header coupling concave part is formed at other side, so that they can be coupled together mutually, and therefore the membrane cartridges of same shape are disposed in parallel, and can be easily coupled only by pressing, and the assembling work is prompt.

The guide hole of the membrane cartridge disposed adjacently by varying the direction mutually is externally fitted to the header forming part of the adjacent other membrane cartridge, so that they can be coupled together mutually, and therefore the adjacent membrane cartridges are formed in one body, and the membrane cartridges are coupled together firmly, and a specified coupling length can be assured without lowering the discharge amount of filtered water, and moreover deviation of the coupled positions due to vibration or other causes can be prevented, and if the coupled positions are slightly deviated due to vibration or other causes, the coupled positions are not detached, and leak of water can be prevented.

EMBODIMENTS OF THE INVENTION

An embodiment of the membrane cartridge in the immersion type membrane separation apparatus of the invention is described below by reference to the accompanying drawings.

FIG. 1 to FIG. 5 show an embodiment of the membrane cartridge in the immersion type membrane separation apparatus of the invention.

When treating wastewater, such as sewage, industrial wastewater or domestic wastewater by using a membrane separation active sludge treating method, an immersion type membrane separation apparatus is immersed and disposed in a reaction tank, and an aeration device is disposed in the bottom in the reaction tank, at a downward position of the immersion type membrane separation apparatus, for ejecting bubbles of membrane cleaning gas. The filtration unit of this immersion type membrane separation apparatus is composed of a plurality of membrane cartridges A (also called flat membrane elements) disposed in parallel, which are assembled as one body in the membrane unit (not shown) so as to be coupled with each other.

This membrane cartridge A is formed same as in the conventional type, that is, a filtration membrane 2 is disposed on the surface of a membrane cartridge main body part 1 as a filtration plate main body by joining at the peripheral edges, and a negative pressure is applied in a liquid passing route (not shown) formed between the surface of this membrane cartridge main body part 1 and the filtration membrane 2, and by making use of this negative pressure, the wastewater in the passage formed between the membrane cartridges A is sucked and filtered.

Herein, the plurality of membrane cartridges A are disposed in parallel and combined and assembled into the filtration unit so as to the passage for lifting bubbles of membrane cleaning gas between them, and elevating together with the wastewater.

Figure 1:
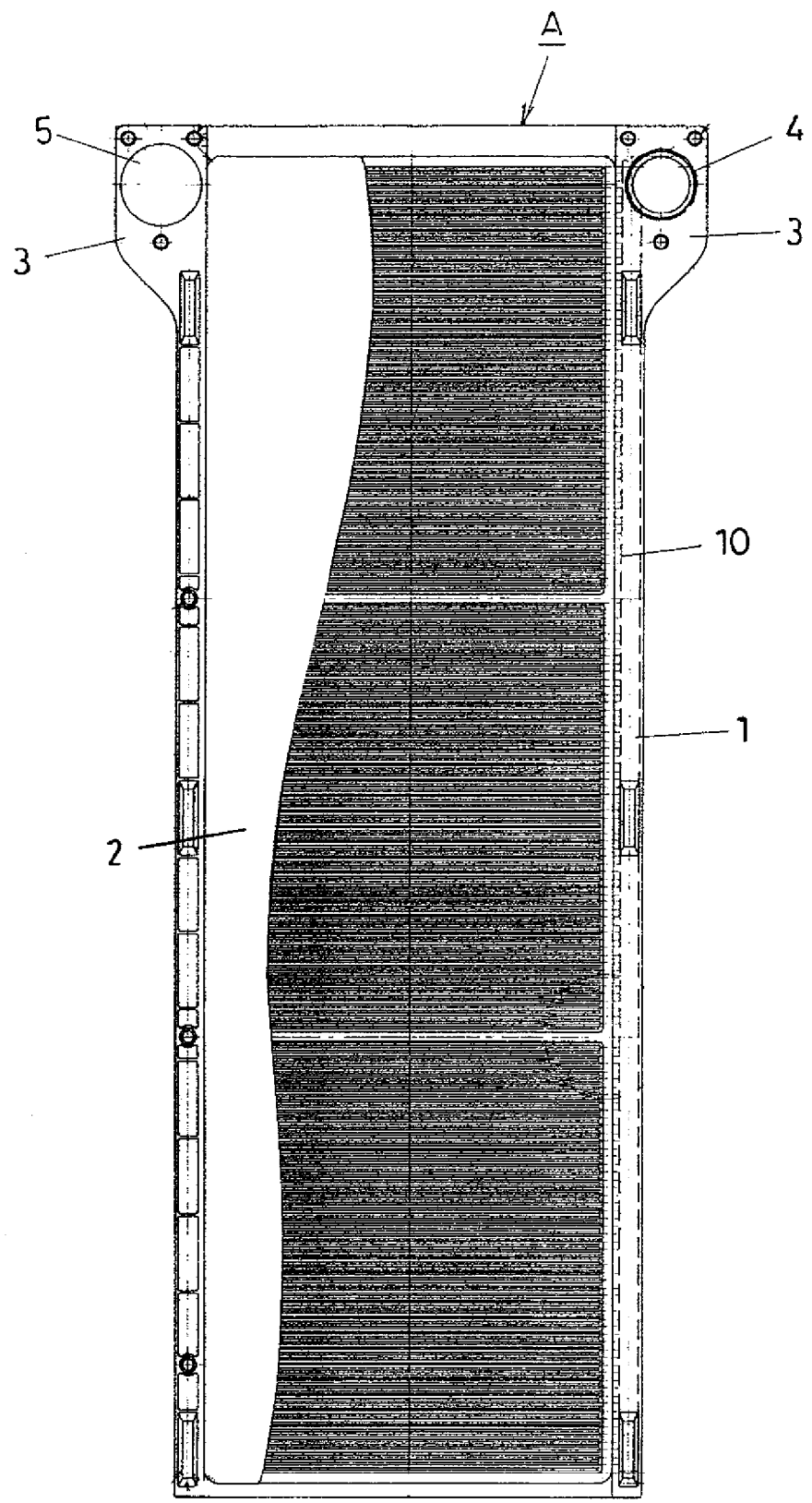
FIG. 1 is a front view showing an embodiment of a membrane cartridge in an immersion type membrane separation apparatus of the invention.
Figure 2:
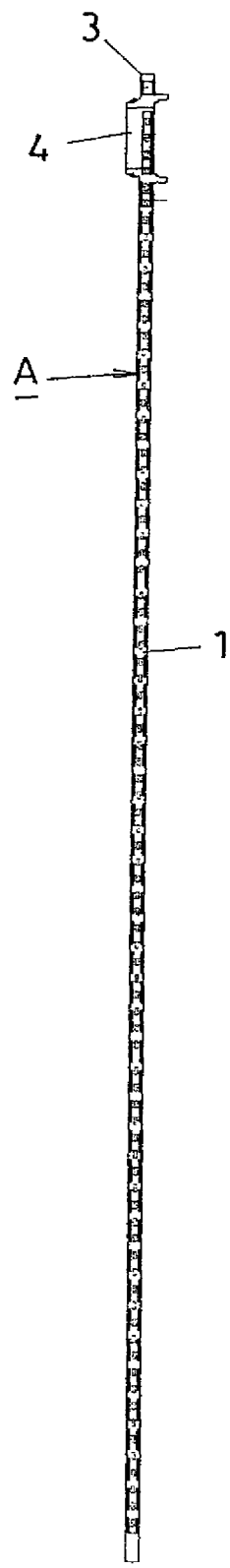
FIG. 2 shows side views, (A) is a right side view and (B) is a left side view.
Figure 2:
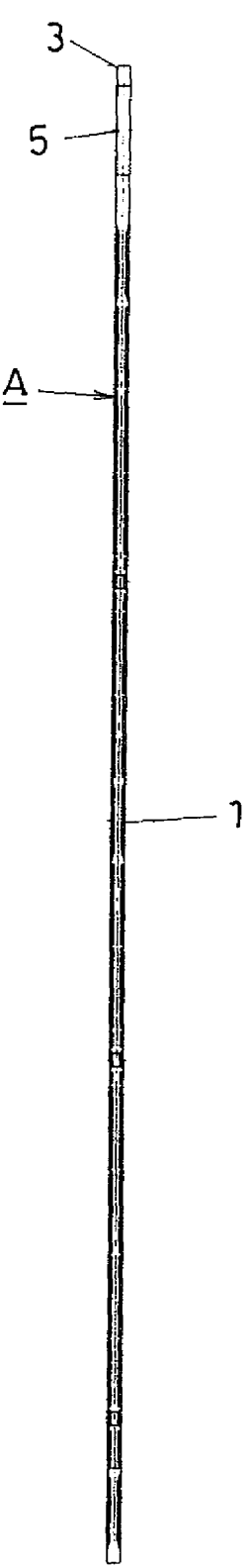

The membrane cartridge A is not particularly specified, but for example, as shown in FIG. 1, the membrane cartridge main body part 1 made of a synthetic resin is formed in a long rectangular shape, a long water path 10 is formed along the overall height of the membrane cartridge A at least at one end of right and left sides of this membrane cartridge main body part 1, and the filtered water filtered on the membrane surface of the membrane cartridge A is guided into a passage 43 in an upper part by way of the water path 10.

Figure 5:
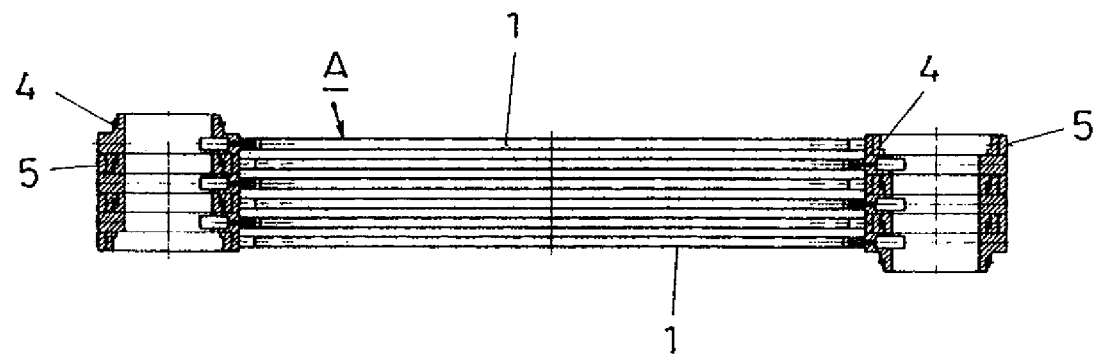
FIG. 5 is a sectional view showing a combined state, (A) is a sectional view of a combination of a plurality, and (B) is a magnified sectional view showing a part thereof.
Figure 5:
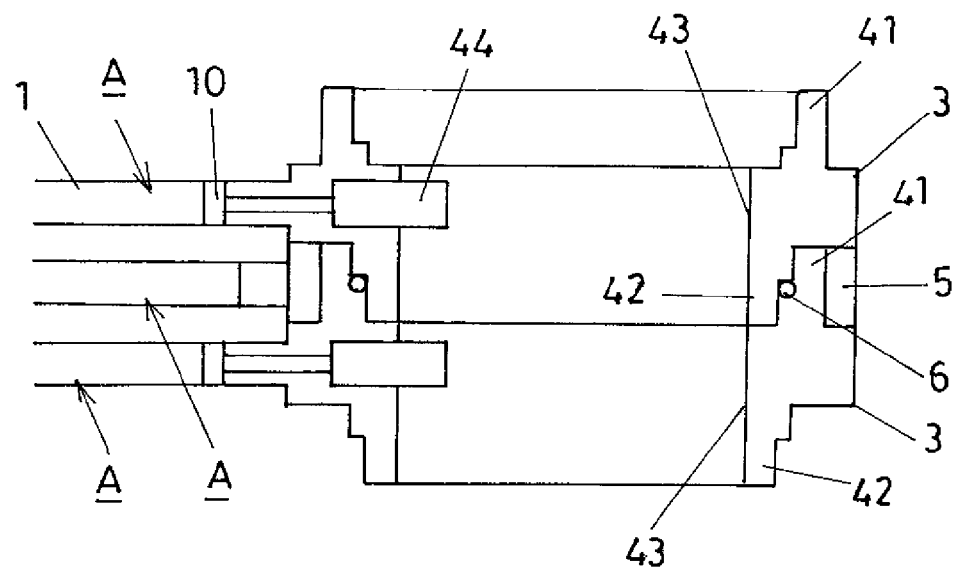

On the membrane cartridge main body part 1, for example, at both sides of the upper end, selvages 3, 3 larger in thickness than the membrane cartridge main body part 1 are formed integrally to project, and at one side, for example, at the right side selvage 3 as shown in FIG. 1, a header forming part 4 is formed, and a guide hole 5 is formed at the other left side selvage 3, relatively, and the header forming parts 4 and the guide holes 5 of the membrane cartridges A, A disposed adjacently by mutually varying the direction (face and back) are mutually fitted and connected as shown in FIG. 5.

On the bonding side of the filtration membrane 2 on the membrane cartridge main body part 1, a multiplicity of water collecting grooves (or a multiplicity of embossed protrusions) are formed in a lateral direction for collecting the filtered water.

Figure 3:
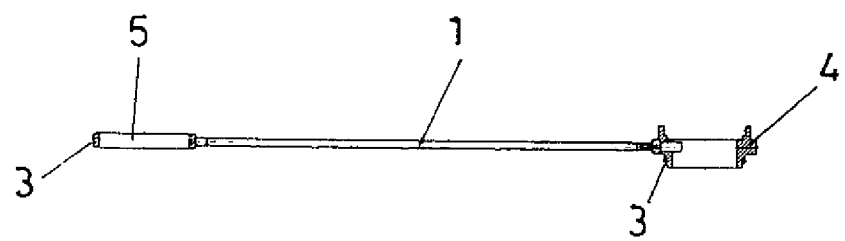
FIG. 3 shows section plans being cut across from the central position of a header forming part, (A) is an overall sectional plan view, (B) is a magnified sectional plan view of the header forming part, and (C) is a magnified sectional plan view of a guide hole part.
Figure 3:
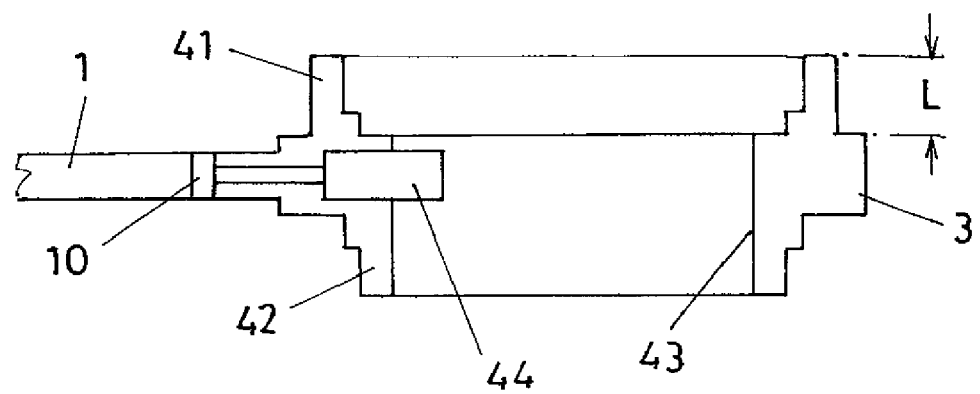
Figure 3:
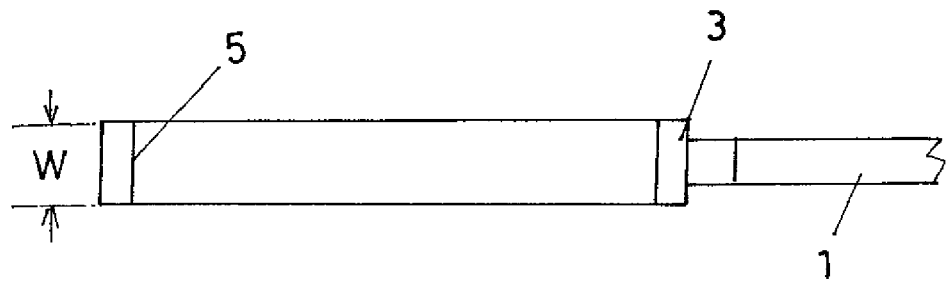
Figure 4:
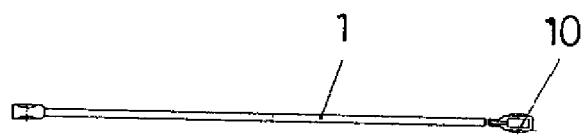
FIG. 4 is a bottom view.

The header forming part 4 formed in one selvage 3 formed as shown in FIG. 3 (A), (B), that is, a ring-shaped header coupling concave part 41 is formed at one side of the disposing direction of the membrane cartridge of the selvage 3, and a ring-shaped header coupling convex part 42 to be fitted into the header coupling concave part is formed at other side, and they are mutually fitted and coupled. Inside of the header coupling concave part 41 and the header coupling convex part 42 both formed in a ring shape, a passage 43 is formed for passing the filtered water, and further inside of these header forming parts 4, a route 44 is formed to communicate with the passage 43, and thereby the filtered water flowing in the liquid passing route formed between the surface of the membrane cartridge main body part 1 and the filtration membrane 2 is guided into the passage 43 by way of the route 44.

In this case, at the coupling positions of the adjacent membrane cartridges A, that is, at the coupling positions of the header coupling concave part 41 and the header coupling convex part 42, an O-ring 6 can be fitted to prevent leak of water.

At other selvage 3, the guide hole 5 is formed, and the caliber of the guide hole 5 is determined so as to be fitted to the outer circumference of the coupling positions, when the adjacent two membrane cartridges A, A are mutually coupled, that is, to be fitted to the outer circumference of the ring-shaped header coupling concave part 41, and its width W is determined same as a projecting length L of the header coupling concave part 41. In this case, it is preferred to eliminate the gap, and they are fitted firmly into one body without getting loose.

Next is explained an assembling method of the membrane cartridges in this immersion type membrane separation apparatus.

When forming a filtration unit by using the membrane cartridges A composed as shown in FIG. 1, the adjacent membrane cartridges A are disposed in parallel by mutually varying the direction, that is, by inverting the face and back sides. As a result, between the mutually adjacent membrane cartridges A, A, the selvages 3, 3 are mutually opposite, but the header forming part 4 of the face-side membrane cartridge A and the guide hole 5 of the back-side membrane cartridge A are opposite to each other. When these face-back inverted adjacent two membrane cartridges A, A are pressed to each other, the guide hole 5 of the back-side membrane cartridge A is externally fitted to the header coupling concave part 41 of the header forming part 4 of the face-side membrane cartridge A, so that the adjacent membrane cartridges A, A are mutually coupled.

In this way, by disposing the mutually adjacent membrane cartridges A by alternately inverting the face and back sides, and pressing, the header coupling concave part 41 and the guide hole 5 are mutually fitted externally and coupled. This state is shown in FIG. 5.

Meanwhile, between the membrane cartridges A of same side, as shown in FIG. 5 (B), one header coupling concave part 41 and other header coupling concave part 41 are fitted together in one body, and the passage 43 is also formed to communicate. In this case, the O-ring is fitted between the header coupling concave part 41 and the header coupling concave part 41.

In the membrane cartridges A disposed adjacently in parallel by mutually inverting the face and back sides, the headers are formed at both right and left ends of the upper part, and the upper pars of the membrane cartridges A are fixed firmly, and vibration hardly occurs, and the filtered water by the membrane cartridges is efficiently sucked from the right and left header forming parts of the membrane cartridges A without using suction pipe.

Moreover, since the header forming parts 4 and the guide holes 5 formed at both right and left ends of the upper part of the membrane cartridges A are formed to maintain a specific relative positional relation, by mutually pressing the adjacent membrane cartridges A, the positioning is achieved, and the header forming parts 4 and the guide holes 5 are mutually fitted, and assembled easily and precisely.

Figure 6:
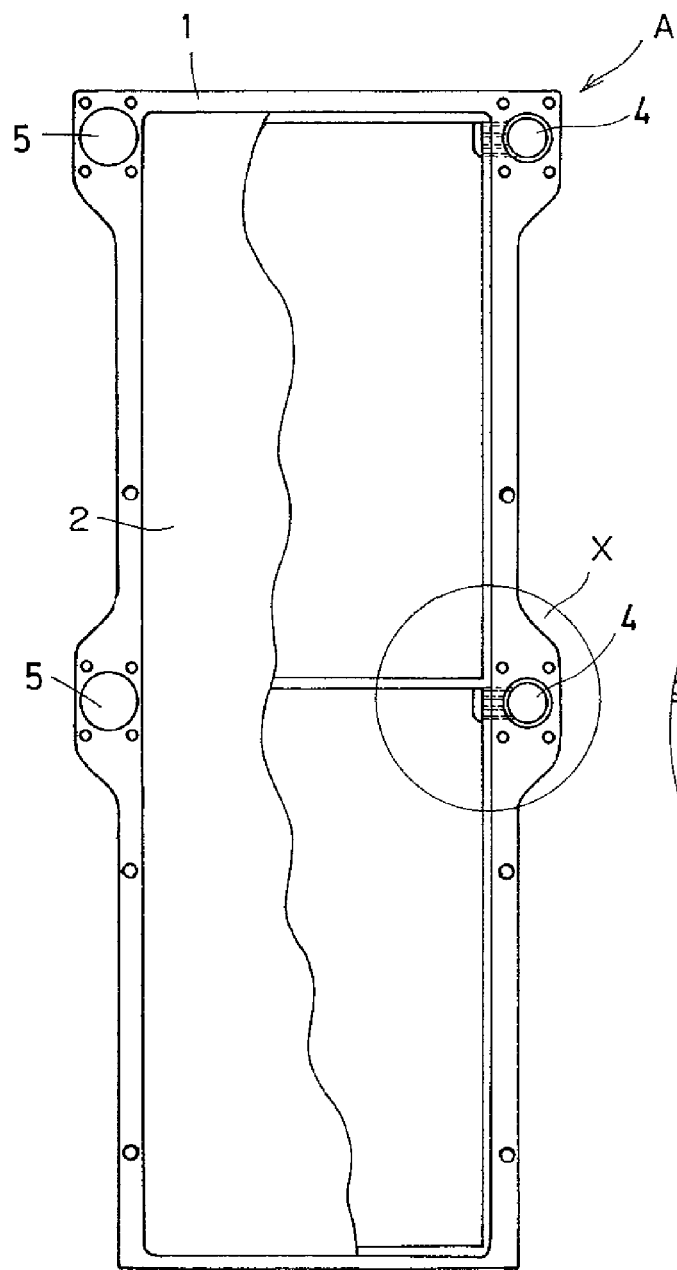
FIG. 6 is a front view showing a modified example of the membrane cartridge in the immersion type membrane separation apparatus of the invention, (A) is an overall view, and (B) is a magnified view of part X in (A).
Figure 6:
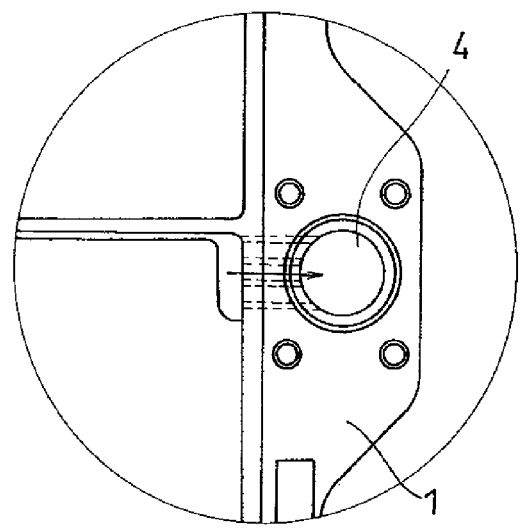

In the membrane cartridges A of the embodiment, the header forming parts 4 and the guide holes 5 formed at both right and left ends of the upper part of the membrane cartridges A are formed to have a specific relative positional relation, but as shown in a modified example in FIG. 6, the membrane cartridges A may be formed in other configuration, in which a junction part is formed in a lateral direction by crossing vertically at the inner side of the peripheral edge of the bonded filtration membranes 2, and independent spaces enclosed by a plurality of (two or more) membrane sheets separated vertically and support plates are formed (without forming a water passing route), and the corresponding header forming parts 4 and guide holes 5 may be formed in the individual independent spaces, and such configuration is also included in the invention.

The membrane cartridge in the immersion type membrane separation apparatus of the invention is described herein by referring to an embodiment, but the invention is not limited to the configuration of the illustrated embodiment alone, but it may be changed and modified in various manners within the scope not departing from the true spirit of the invention.

Industrial Applicability

The membrane cartridge in the immersion type membrane separation apparatus of the invention is characterized by the feature of coupling the adjacently disposed membrane cartridges firmly so as to suppress vibrations applied to the membrane cartridges, and is therefore preferably usable in applications of the immersion type membrane separation apparatus.

DESCRIPTION OF REFERENCE NUMERALS

A Membrane cartridge
1 Membrane cartridge main body part
2 Filtration film
3 Selvage
4 Header forming part
41 Header coupling concave part
42 Header coupling convex part
43 Passage
44 Route
5 Guide hole
6 O-ring

The invention claimed is:

1. A membrane cartridge in an immersion type membrane separation apparatus, being a membrane cartridge in an immersion type membrane separation apparatus composed so as to form passages mutually by disposing adjacently in parallel, with a filtration membrane being disposed on a surface of a membrane cartridge main body as a filtration plate main body by joining at peripheral edges,
wherein selvages larger in thickness than the membrane cartridge main body are formed at both sides of the membrane cartridge, and a header forming part is formed on one selvage, and a guide hole is formed in other selvage relatively, and the header forming part and the guide hole of the membrane cartridge disposed adjacently by varying the direction mutually are formed to communicate and connect with each other.

2. The membrane cartridge in the immersion type membrane separation apparatus according to claim 1, wherein the header forming part is formed to communicate with the passage of filtered water formed in the membrane cartridge, and is composed to communicate mutually with the header forming part formed in the other membrane cartridge disposed in parallel.

3. The membrane cartridge in the immersion type membrane separation apparatus according to claim 1, wherein the header forming part is formed in a ring shape to project in the disposing direction of the membrane cartridge, and a header coupling convex part is formed at one side, and a header coupling concave part is formed at other side, so that they can be coupled together mutually.

4. The membrane cartridge in the immersion type membrane separation apparatus according to claim 1, wherein the guide hole of the membrane cartridge disposed adjacently by varying the direction mutually is externally fitted to the header forming part of the adjacent other membrane cartridge, so that they can be coupled together mutually.

* * * * *